(12) United States Patent
Zheng

(10) Patent No.: US 11,560,321 B2
(45) Date of Patent: Jan. 24, 2023

(54) NICKELATE CATHODE MATERIALS

(71) Applicant: Energizer Brands, LLC, St. Louis, MO (US)

(72) Inventor: Guanghong Zheng, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 39 days.

(21) Appl. No.: 17/032,496

(22) Filed: Sep. 25, 2020

(65) Prior Publication Data

US 2021/0094841 A1 Apr. 1, 2021

Related U.S. Application Data

(60) Provisional application No. 62/907,194, filed on Sep. 27, 2019.

(51) Int. Cl.
*C01G 53/00* (2006.01)
*H01M 10/30* (2006.01)

(52) U.S. Cl.
CPC ............ *C01G 53/42* (2013.01); *H01M 10/30* (2013.01); *C01P 2002/72* (2013.01); *C01P 2002/74* (2013.01)

(58) Field of Classification Search
CPC ....... C01G 53/40; C01G 53/42; H01M 10/30; C01P 2002/72; C01P 2002/74
See application file for complete search history.

(56) References Cited

U.S. PATENT DOCUMENTS

| | | | |
|---|---|---|---|
| 8,298,706 B2 * | 10/2012 | Christian | B26B 21/225 429/231.95 |
| 9,028,564 B2 | 5/2015 | Nelson et al. | |
| 9,793,542 B2 | 10/2017 | Nelson et al. | |
| 9,793,543 B2 | 10/2017 | Anglin et al. | |
| 10,276,869 B2 | 4/2019 | Nelson et al. | |
| 2018/0331361 A1 | 11/2018 | Nelson et al. | |

FOREIGN PATENT DOCUMENTS

| | | | |
|---|---|---|---|
| CA | 1053325 A | | 4/1979 |
| WO | WO 2017-004121 | * | 1/2017 |
| WO | WO 2017/004121 A1 | | 1/2017 |

OTHER PUBLICATIONS

Zhao, Chenglong, et al., "Ni-based Cathode Materials for Na-ion Batteries", Nano Research, Jun. 27, 2019, pp. 2018-2030, vol. 12, No. 9, Tsinghua University Press, CN.*
International Searching Authority, Invitation to Pay Additional Fees received for Application No. PCT/US2020/052636, dated Dec. 11, 2020, 9 pages, European Patent Office, Netherlands.
Kyusung, Park, et al., "Electrochemical and Chemical Properties of $Na_2NiO_2$ as a Cathode Additive for a Rechargeable Sodium Battery", Chemistry of Materials, Sep. 11, 2015, vol. 27, No. 19, pp. 6682-6688, American Chemical Society.

* cited by examiner

*Primary Examiner* — Brittany L Raymond
(74) *Attorney, Agent, or Firm* — Alston & Bird LLP

(57) ABSTRACT

Nickelate cathode materials are provided, wherein said cathode material has an X-ray diffraction (XRD) pattern comprising a first peak from about 40.0-41.6 2Θ, and a second peak from about 62.6-63.0 2Θ. Methods of preparing such cathode materials are also provided. Alkaline electrochemical cells comprising said cathode materials are also provided.

15 Claims, 5 Drawing Sheets

NICKELATE CATHODE MATERIALS

RELATED APPLICATIONS

This application claims the benefit of U.S. Provisional App. No. 62/907,194 filed Sep. 27, 2019, which is hereby incorporated by reference in its entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

High valent nickel materials including nickel oxyhydroxide (NiOOH), nickel dioxide ($NiO_2$), and various forms of nickel oxides, nickelates, and nickel oxyhydroxides are useful as cathode materials in alkaline systems due to their high capacity and cell voltage. However, these materials are thermodynamically unstable in aqueous electrolytes, resulting in the electrochemical reduction of the nickel cathode (loss of electrode capacity). Therefore, the shelf life of alkaline batteries with high valent nickel cathodes is limited compared to batteries containing some other cathode materials.

It was in an effort to overcome the limitations of the above-described cells, and other such cells, that the present embodiments were designed.

BRIEF SUMMARY

An embodiment is a nickelate cathode material, said cathode material having an X-ray diffraction (XRD) pattern comprising a first peak from about 40.0-41.6 2Θ, and a second peak from about 62.6-63.0 2Θ.

An embodiment is a method of making a nickel-containing cathode material, said method comprising
a) reacting a sodium compound with a nickel precursor, so as to produce a nickel compound; and
b) contacting said nickel compound with an acidic solution, thereby producing the nickelate cathode material.

An embodiment is a nickelate cathode material made by any of the above methods.

An embodiment is an alkaline electrochemical cell comprising any of the above nickelate cathode materials.

DETAILED DESCRIPTION

Figure 1:
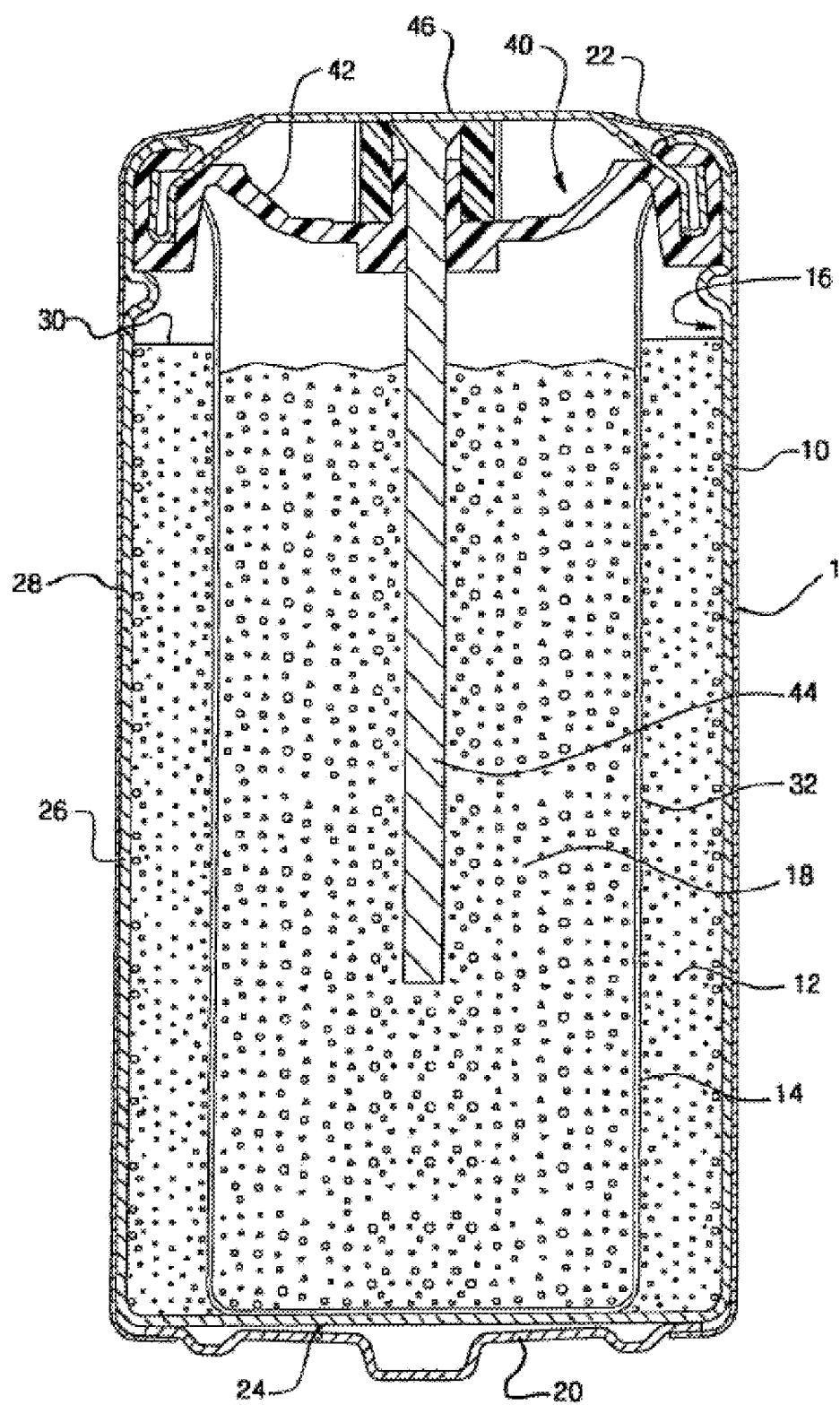
FIG. 1 is a cross-sectional elevational view of an alkaline electrochemical cell of an embodiment.

Various embodiments now will be described more fully hereinafter with reference to the accompanying drawing, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within 10%, ±5%, or ±1% of the numerical value or range recited or claimed.

As used herein, "nickelate" refers to a salt containing an anion which contains nickel, or a compound comprising nickel bound to oxygen and at least one other element.

As used herein, "nickel compound" refers to any compound comprising nickel.

As used herein, "nickel precursor" refers to a compound comprising nickel that is reacted with a sodium-containing compound in order to produce a different compound comprising nickel.

As used herein, "oxide" refers to a chemical compound that contains at least one oxygen atom and one other element. As used herein, "nickel oxide" refers to any nickel-containing oxide. Nickel oxides may comprise other cations and anions. Non-limiting examples include nickel dioxide ($NiO_2$), nickel hydroxide ($Ni(OH)_2$), and nickel oxides (such as nickel (IV) oxides).

As used herein, "oxyhydroxide" refers to a chemical compound or complex containing an oxide group and a hydroxide group. As used herein, "nickel oxyhydroxide" refers to any nickel-containing oxyhydroxide. Nickel oxyhydroxides may comprise other cations and anions. A non-limiting example is nickel oxyhydroxide (NiOOH).

As used herein, "nickel nitrate" refers to $Ni(NO_3)_2$ or any hydrate thereof. An example is $Ni(NO_3)_2 \cdot 6H_2O$ (nickel nitrate hexahydrate).

As used herein, "nickel carbonate" refers to any compound comprising both nickel and carbonate ions. Non-limiting examples include $NiCO_3$ and its hydrates, and $Ni_4CO_3(OH)_6(H_2O)_4$.

As used herein, "sodium compound" refers to any compound comprising sodium. In an embodiment, the sodium compound comprises both sodium and oxygen. Non-limiting examples include NaOH (sodium hydroxide), $Na_2O$ (sodium oxide), and $Na_2O_2$ (sodium peroxide).

As used herein, "improvement" with respect to storage stability means that the storage stability (i.e. "shelf-life") is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, an "alkali metal" is an element from Group IA of the periodic table. Non-limiting examples include Li, Na, K, Rb, and Cs.

As used herein, an "alkaline earth metal" is an element from Group IIA of the periodic table. Non-limiting examples include Mg, Ca, and Sr.

As used herein, a "transition metal" is an element from Groups IB-VIIIB of the periodic table. Non-limiting examples include Co, Mn, Zn, Y, Nb, and Ti.

As used herein, "other metals" or "another metal" includes all metals on the periodic table not included in the previously-mentioned Groups, including Al, Ga, In, Sn, Tl, Pb, and Bi.

As used herein, a "primary" electrochemical cell is a non-rechargeable (i.e., disposable) electrochemical cell. A "secondary" electrochemical cell is a rechargeable electrochemical cell.

As used herein, "conductivity" refers to a given material's ability to conduct electric current. This is typically measured in Siemens per meter (S/m).

An embodiment is a nickelate cathode material, said cathode material having an X-ray diffraction (XRD) pattern comprising a first peak from about 40.0-41.6 2Θ, and a second peak from about 62.6-63.0 2Θ.

In an embodiment, said XRD pattern further comprises at least one peak selected from the group consisting of a third peak from about 18.1-19.7 2Θ, a fourth peak from about 24.5-25.7 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 11.8-13.0 2Θ, a tenth peak from about 45.3-46.9 2Θ, and an eleventh peak from about 47.4-49.0 2Θ.

In an embodiment, said XRD pattern further comprises at least two, at least three, at least four, at least five, at least six, at least seven, or at least eight peaks selected from the group consisting of a third peak from about 18.1-19.7 2Θ, a fourth peak from about 24.5-25.7 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 11.8-13.0 2Θ, a tenth peak from about 45.3-46.9 2Θ, and an eleventh peak from about 47.4-49.020.

In an embodiment, said XRD pattern further comprises a third peak from about 18.1-19.7 2Θ, a fourth peak from about 24.5-25.7 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 11.8-13.0 2Θ, a tenth peak from about 45.3-46.9 2Θ, and an eleventh peak from about 47.4-49.0 2Θ.

In an embodiment, said first peak has a full width at half maximum (FWHM) of about 1.00, said second peak has a FWHM of about 0.29, said third peak has a FWHM of about 0.97, said fourth peak has a FWHM of about 0.68, said fifth peak has a FWHM of about 0.95, said sixth peak has a FWHM of about 0.19, said seventh peak has a FWHM of about 0.46, said eighth peak has a FWHM of about 1.24, said ninth peak has a FWHM of about 0.64, said tenth peak has a FWHM of about 0.95, and said eleventh peak has a FWHM of about 1.12.

In an embodiment, said first peak has a normalized intensity relative to the fifth peak of 58±12, said second peak has a normalized intensity relative to the fifth peak of 30±6, said third peak has a normalized intensity relative to the fifth peak of 210±42, said fourth peak has a normalized intensity relative to the fifth peak of 64±13, said fifth peak has a normalized intensity of 100, said sixth peak has a normalized intensity relative to the fifth peak of 70±14, said seventh peak has a normalized intensity relative to the fifth peak of 17±5, said eighth peak has a normalized intensity relative to the fifth peak of 44±10, said ninth peak has a normalized intensity relative to the fifth peak of 353±58, said tenth peak has a normalized intensity relative to the fifth peak of 31±10, and said eleventh peak has a normalized intensity relative to the fifth peak of 38±10.

In an embodiment, said first peak is 40.8±0.2 2Θ, and said second peak is 62.8±0.2 2Θ.

In an embodiment, said first peak is 40.8±0.2 2Θ, said second peak is 62.8±0.2 2Θ, said third peak is 18.9±0.2 2Θ, said fourth peak is 25.1±0.2 2Θ, said fifth peak is 37.2±0.2 2Θ, said sixth peak is 43.2±0.2 2Θ, said seventh peak is 60.0±0.2 2Θ, said eighth peak is 66.0±0.2 2Θ, said ninth peak is 12.4±0.2 2Θ, said tenth peak is 46.1±0.2 2Θ, and said eleventh peak is 48.2±0.2 2Θ.

In an embodiment, said first peak is about 40.4-41.2 2Θ, said second peak is about 62.7-62.9 2Θ, said third peak is about 18.5-19.3 2Θ, said fourth peak is about 24.8-25.4 2Θ, said fifth peak is about 36.4-38.0 2Θ, said sixth peak is about 43.0-43.4 2Θ, said seventh peak is about 59.6-60.4 2Θ, said eighth peak is about 65.2-66.8 2Θ, a ninth peak is about 11.8-13.0 2Θ, said tenth peak is about 45.3-46.9 2Θ, and said eleventh peak is about 47.4-49.0 2Θ.

In an embodiment, said first peak is 40.84±0.07 2Θ, or 40.84±0.03 2Θ.

In an embodiment, said second peak is 62.76±0.07 2Θ, or 62.76±0.03 2Θ.

In an embodiment, said third peak is 18.93±0.07 2Θ, or 18.93±0.03 2Θ.

In an embodiment, said fourth peak is 25.07±0.07 2Θ, or 25.07±0.03 2Θ.

In an embodiment, said fifth peak is 37.18±0.07 2Θ, or 37.18±0.03 2Θ.

In an embodiment, said sixth peak is 43.22±0.07 2Θ, or 43.22±0.03 2Θ.

In an embodiment, said seventh peak is 60.00±0.07 2Θ, or 60.00±0.03 2Θ.

In an embodiment, said eighth peak is 65.95±0.07 2Θ, or 65.95±0.03 2Θ.

In an embodiment, said ninth peak is 12.39±0.07 2Θ, or 12.39±0.03 2Θ.

In an embodiment, said tenth peak is 46.06±0.07 2Θ, or 46.06±0.03 2Θ.

In an embodiment, said eleventh peak is 48.21±0.07 2Θ, or 48.21±0.03 2Θ.

In an embodiment, said nickelate cathode material is substituted. In an embodiment, said substituted nickelate cathode material further comprises an alkali metal. In an embodiment, said substituted nickelate cathode material further comprises an alkaline earth metal, a transition metal, or another metal.

An embodiment is a method of making a nickelate cathode material, said method comprising
a) reacting a sodium compound with a nickel precursor, so as to produce a nickel compound; and
b) contacting said nickel compound with an acidic solution, thereby producing the nickelate cathode material.

An embodiment is a method of making a nickelate cathode material, said method comprising contacting a nickel compound with an acidic solution, thereby producing the nickelate cathode material.

In an embodiment, said sodium compound is an oxide, a hydroxide, or a peroxide. In an embodiment, said sodium compound is selected from the group consisting of NaOH, $Na_2O$, and $Na_2O_2$.

In an embodiment, said nickel precursor is a nickel oxide, nickel hydroxide, or a nickel carbonate. In an embodiment, said nickel precursor is nickel nitrate. In an embodiment, the nickel nitrate is $Ni(NO_3)_2 \cdot 6H_2O$.

In an embodiment, step a) is performed in deionized water. In an embodiment, step a) is performed at greater than about 400° C. In an embodiment, step a) is performed at about 700-900° C. In an embodiment, step a) is performed at about 800° C. In an embodiment, step a) is performed for about 5-60 hours. In an embodiment, step a) is performed for about 60 hours.

In an embodiment, said acidic solution comprises $H_2SO_4$. In an embodiment, said acidic solution has an acid concentration of about 6M. In an embodiment, step b) is performed at about 0-10° C. In an embodiment, step b) is performed at 0° C. In an embodiment, step b) is performed for at least about 2 hours. In an embodiment, step b) is performed for at least about 10 hours. In an embodiment, step b) is performed for about 20 hours.

In an embodiment, said method further comprises drying the material produced in step b). In an embodiment, said drying occurs at at least 25° C., 30° C., 40° C., 50° C., 60° C., or 70° C. In an embodiment, said drying occurs for at least 1, 2, 3, 4, 5, 6, 7, 8, 9, 10, 11, 12, 13, 14, or 15 hours.

An embodiment is a nickelate cathode material made by any of the above methods.

An embodiment is an alkaline electrochemical cell comprising any of the above nickelate cathode materials.

In an embodiment, the electrochemical cell is a primary cell. In an embodiment, the electrochemical cell is a secondary cell.

In an embodiment, said electrochemical cell comprises a negative electrode which comprises an active material selected from the group consisting of zinc, magnesium, aluminum and silicon.

In an embodiment, said electrochemical cell comprises an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$). In an embodiment, the electrolyte solution comprises KOH.

In an embodiment, said electrochemical cell has a voltage of 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

An embodiment is a method of making a nickelate cathode material, said method comprising contacting a nickel compound with an acidic solution, thereby producing the nickelate cathode material.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and other electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

The aqueous alkaline electrolyte may comprise an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (median diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

Second electrode 12, also referred to herein as the positive electrode or cathode, has a nickelate compound (or "nickelate cathode material") as its electrochemically active material. The active material is present in an amount generally from about 80 to about 98 weight percent and preferably from about 81 to 97 weight percent based on the total weight of the positive electrode, i.e., nickelate cathode material, binder, conductive material, positive electrode electrolyte, and additives, if present.

The active cathode material may be a blend of a nickelate cathode material and other active materials such as electrolytic manganese dioxide (EMD), chemical manganese dioxide (CMD), copper oxide, and others. The weight percentage of the nickel-containing compound could be in the range of 5% to 100% of the total active cathode material. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed (known as impact molding). Second electrode 12 has a ledge 30 and an interior surface 32 as illustrated in FIG. 1. Alternatively, the positive electrode may be formed by pre-forming a plurality of rings from the mixture comprising the nickelate cathode material, and then inserting the rings into the container to form the tubular-shaped second electrode (known as ring molding). The cell shown in FIG. 1 would typically include 3 or 4 rings.

The active material may be in the form of particles having any size suitable for use in an electrode mixture. In an embodiment, the active material is in the form of particles having an average size of approximately 1-20 microns, or 1-10 microns, or 1-5 microns, or 7-10 microns. In an embodiment, the active material is in the form of particles having a size ranging from 0.1-40 microns.

The cathode also comprises a binder, which may be any binder known in the art. Non-limiting examples of binders include polyvinylidene fluoride (PVDF), polyethylene, copolymers based on polystyrene and ethylene/propylene, such as those available under the Kraton® trade name, sold by Kraton Corporation (Houston, Tex.), polytetrafluoroethene (PTFE), poly(3,4-ethylenedioxythiophene) (PEDOT) copolymers, polystyrene sulfonate (PSS), and PEDOT:PSS polymer mixtures. The binder may be in the form of particles having any size suitable for use in an electrode mixture.

The cathode also comprises a conductive material, which may be a conductive carbon. The conductive carbon may be graphite, and the graphite may be expanded graphite. The graphite may be in the form of particles having any size suitable for use in an electrode mixture. In an embodiment, the graphite is in the form of particles having an average size ranging from nanoparticle-sized to 65 microns. In an embodiment, the maximum size of the graphite particles is 110 microns.

An example of an additional cathode additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as Coathylene® (Axalta Coating Systems, Glen Mills, Pa.), and calcium stearate.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.1:1, such as greater than 1.2:1, and specifically 1.3:1 for impact molded positive electrodes. The A:C ratio for ring molded positive electrodes can be about 1.3:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

DISCUSSION AND EXAMPLES

Example 1—Material Synthesis

The precursor of the new material was synthesized via procedures similar to those outlined by Arai et al. in Solid State Ionics, 80 (1995), pp. 261-269. Briefly, a reagent grade of NaOH and $Ni(NO_3)_2 \cdot 6H_2O$ were mixed in deionized water at a 1:1 molar ratio. The mixture was heated at 800° C. for 60 hours.

The resultant material was washed with 6 M $H_2SO_4$ at 0° C. for 20 hrs. Following this washing step, the material was dried at 70° C. for 15 hrs to give the final product.

Example 2—XRD Characterization

The material prepared in Example 1 was characterized with D-8 Advance X-ray diffractometer for the powder XRD pattern. The XRD pattern of the new material is compared in FIG. 2 with the alpha-delithiated nickelate (or "alpha nickelate") described in U.S. Patent Application No. 2018/0331361. Briefly, the alpha-nickelate was synthesized by calcinating $Ni(OH)_2$ with LiOH in high temperature (e.g. 750° C.). The resulting $LiNiO_2$ was delithiated in $H_2SO_4$ solution and washed and dried to form alpha-nickelate. The beta-delithiated nickelate (or "beta nickelate") described in U.S. Pat. No. 9,793,543 was synthesized by treating the non-stoichiometric alpha-nickelate in alkaline solutions such as KOH. Bruker's DIFFRAC.EVA V5.0 software was used to identify and characterize the peaks on the new material. EVA identified 11 major peaks with additional minor peaks. The peak positions (2Θ), the full width at half-maximum (FWHM), and relative peak positions are summarized in Table 1.

Figure 2:
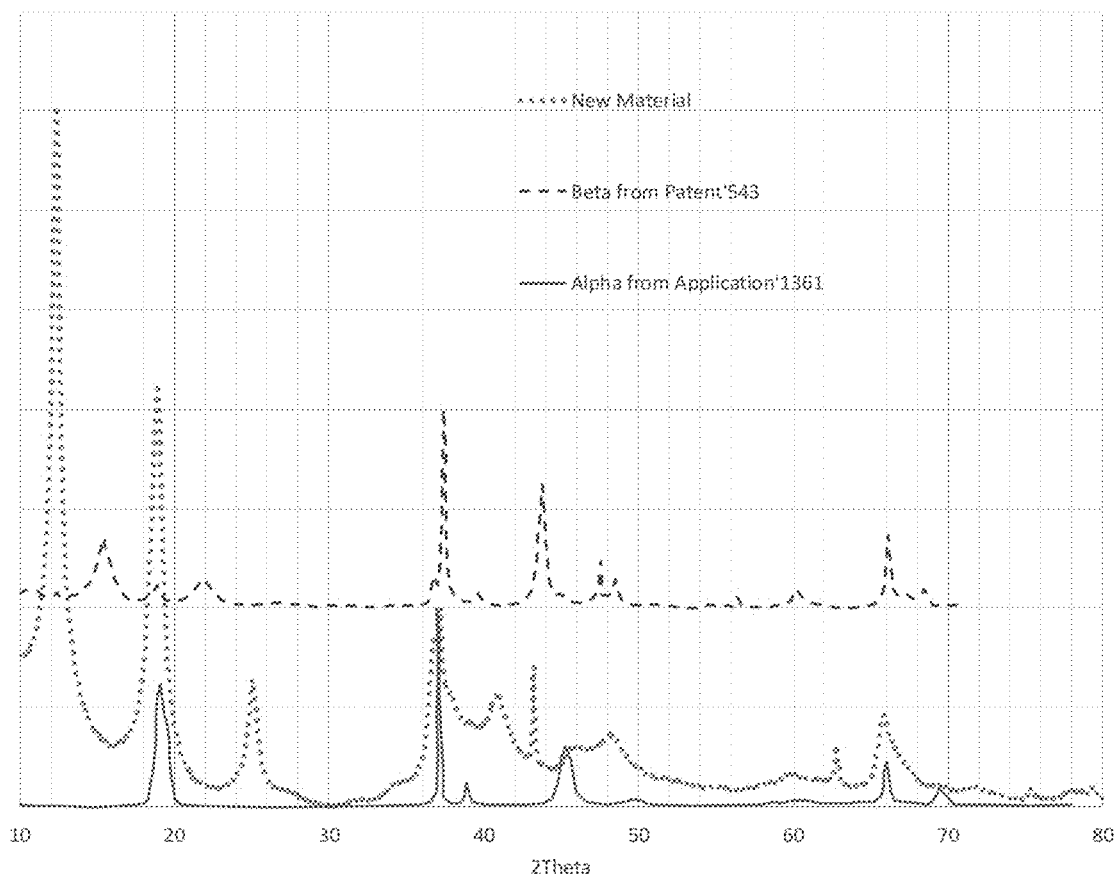
FIG. 2 shows X-ray diffraction (XRD) patterns for a new nickelate material, compared with the XRD patterns for an alpha-delithiated nickelate material and a beta-delithiated nickelate material.

From both the XRD pattern plot in FIG. 2 and the parameters in Table 1, one can easily see that the new material is different from both alpha- and beta-nickelate in term of peak positions, FWHM and relative intensity. Furthermore, the new material has additional peaks which are not present in either alpha or beta-nickelate. More specifically, the beta-delithiated layered nickel oxide of U.S. Pat. No. 9,793,543, which is asserted to have improved stability over alpha-delithiated layered nickel oxide, is described as having 9 XRD peak positions, compared to the 11 major peaks of the new material described herein. In particular, at least the peaks identified below as Peaks 1, 2, 3, 4, 9, 10, and 11 are not found in the beta-delithiated nickel oxide.

TABLE 1

XRD peaks from new nickelate material

| Peak | Peak 2Θ position | FWHM | Intensity relative to Peak 5 | Peak order by intensity (highest = 1) |
|---|---|---|---|---|
| 1 | 40.841 | 1.004 | 58 | 5 |
| 2 | 62.766 | 0.289 | 30 | 10 |
| 3 | 18.930 | 0.965 | 210 | 2 |
| 4 | 25.069 | 0.683 | 64 | 3 |
| 5 | 37.183 | 0.948 | 100 | 4 |
| 6 | 43.216 | 0.185 | 70 | 6 |
| 7 | 59.999 | 0.460 | 17 | 9 |
| 8 | 65.953 | 1.242 | 44 | 11 |
| 9 | 12.394 | 0.638 | 353 | 1 |
| 10 | 46.057 | 0.954 | 31 | 7 |
| 11 | 48.206 | 1.117 | 38 | 8 |

Example 3—Half Cell Discharge

Figure 3:
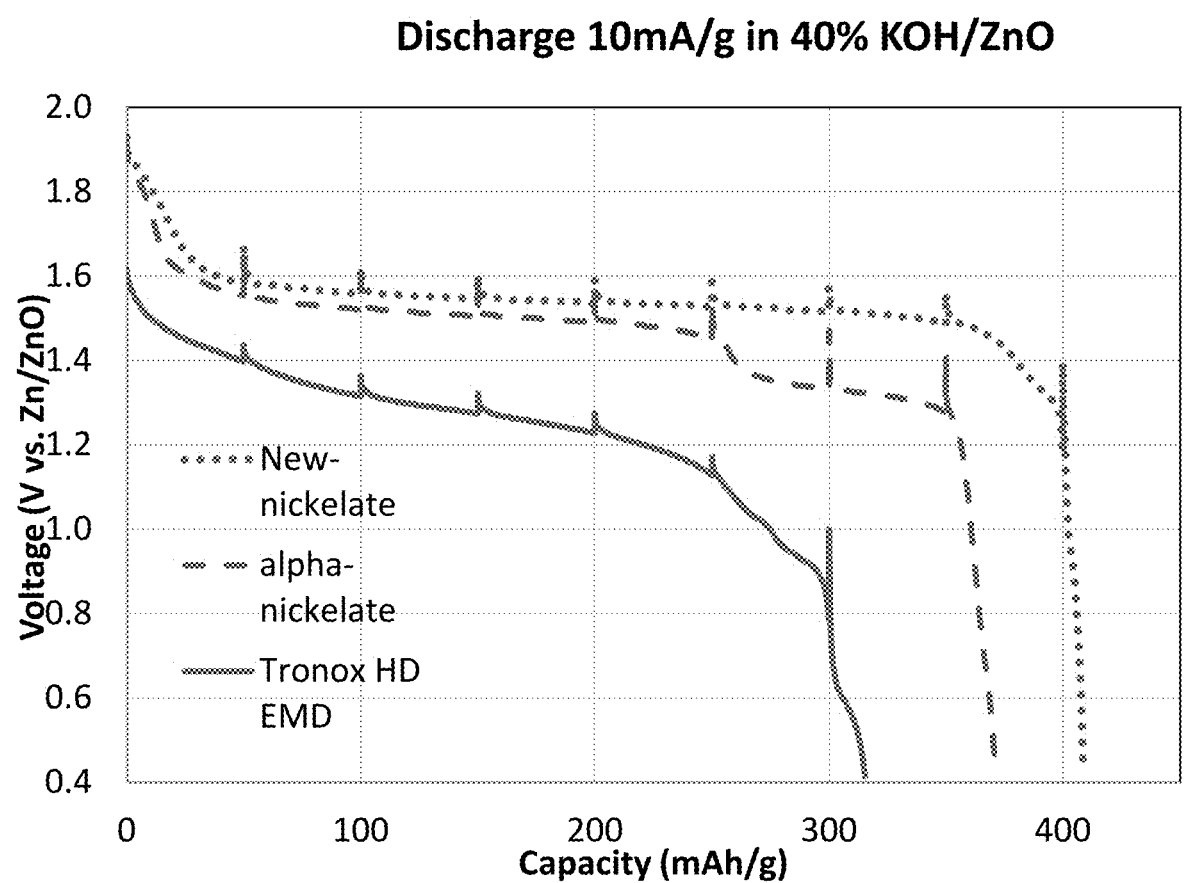
FIG. 3 shows comparative results for a half-cell discharge experiment, comparing results using the new nickelate material with an alpha-delithiated nickelate material and Tronox HD EMD.

To evaluate the discharge capacity of the new material, 49 wt % of the new active material was mixed with 49% SFG 15 graphite and 2% coathylene binder to form a cathode mix. 200 mg of the cathode mix was pressed into a 357 button cell can with a force of 5,000 lbf. The button cell was placed into an acrylic plastic testing fixture filled with 40 wt % KOH saturated with ZnO, and discharged at 10 mA/g rate. The discharge rate is based on the new active material. FIG. 3 shows the discharge curve of the new material, an alpha-nickelate as well as Tronox HD EMD for comparison.

From FIG. 3, it can be seen that the new material has a higher discharge capacity than both the alpha-nickelate and Tronox HD EMD. For example, at a cutoff voltage 1.0 V vs. Zn/ZnO reference electrode, the discharge capacity of the new material, the alpha-nickelate and EMD is 402, 306 and 275 mA/g, respectively.

Example 4—Qualitative Stability Testing

Figure 4A:
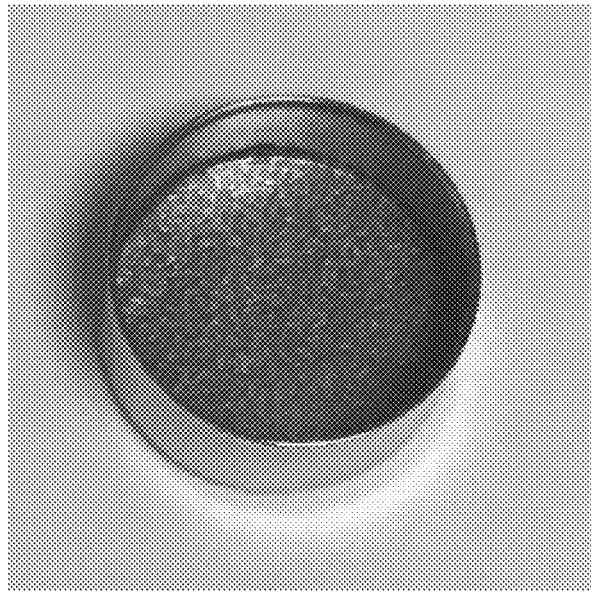
FIGS. 4A-4D and 5A-5D show stages of testing the alpha-delithiated nickelate material's and the new material's stability, respectively, in KOH electrolyte.
Figure 4B:
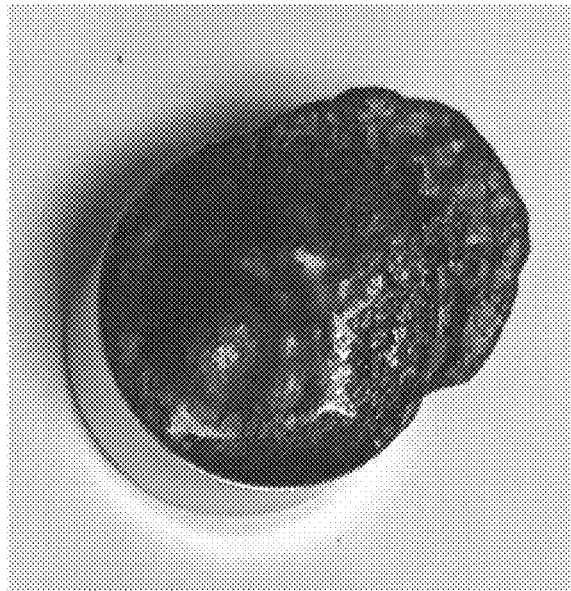
Figure 4C:
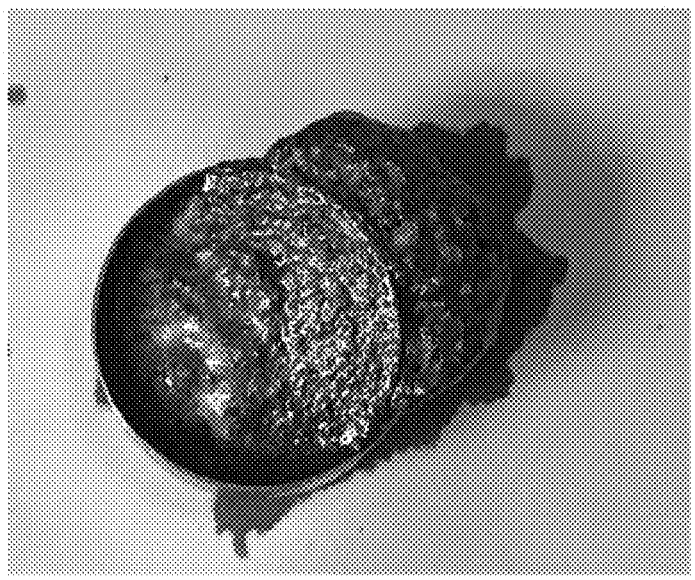
Figure 4D:
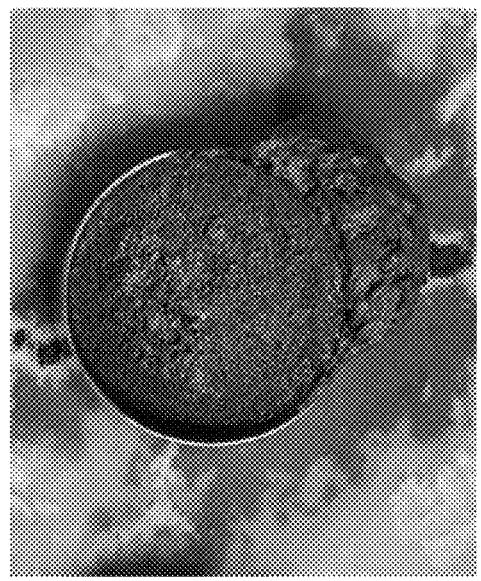

To test the material's stability in KOH electrolyte, 200 mg of pure material (without graphite or binder) was pressed into a 357 button can to form a pellet inside the can. 300 mg of 40% KOH saturated with ZnO was added onto the top of the pellet. Gassing occurred immediately once the electrolyte contacted the alpha-nickelate pellet, and the pellet swelled and disintegrated due to gassing and electrolyte absorption. FIG. 4A shows the alpha nickelate material prior to the addition of electrolyte. The alpha nickelate pellet overflowed the button cell in about 10 minutes, as shown in FIG. 4B. FIGS. 4C and 4D show the alpha nickelate at one hour and 24 hours following the addition of electrolyte, respectively.

Figure 5A:
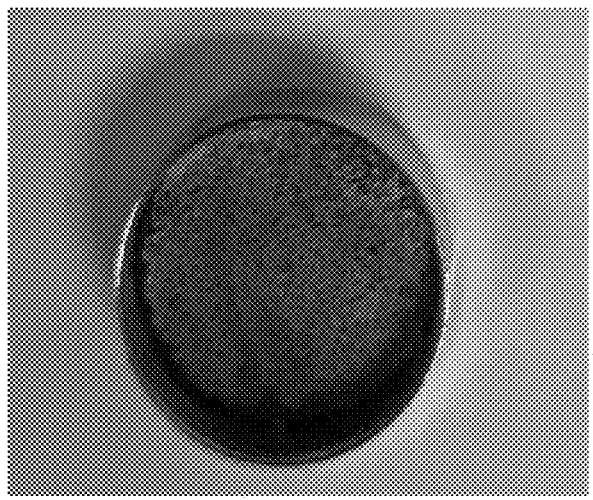
Figure 5B:
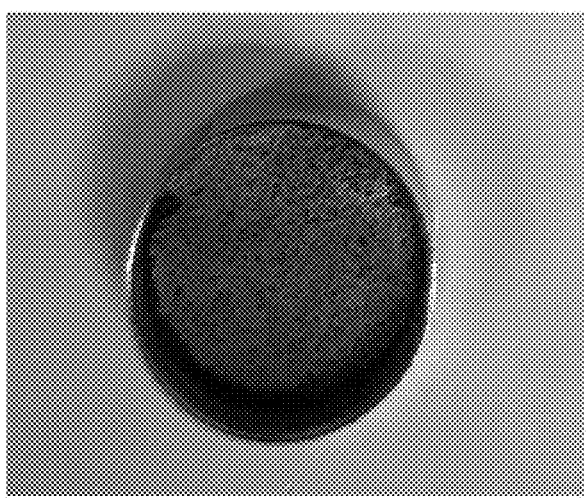
Figure 5C:
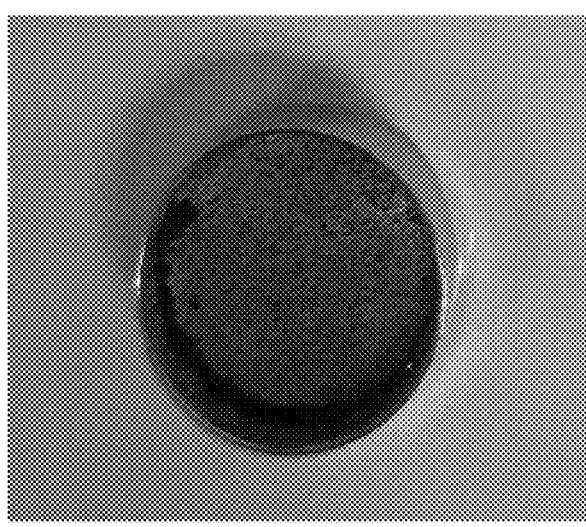
Figure 5D:

Surprisingly, no gassing occurred with the new material even after 24 hours, and the pellet kept its integrity as shown in the photos in FIGS. 5A (prior to the addition of electrolyte), 5B (10 minutes post-addition of electrolyte), 5C (1 hour post-addition), and 5D (24 hours post-addition). A lab spatula had to be used in order to break loose the pellet after the testing. Accordingly, the new material is very stable in concentrated KOH solutions, particularly compared to the tested alpha nickelate.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments. Further, the embodiments illustratively disclosed herein suitably may be practiced in the absence of any element which is not specifically disclosed herein.

What is claimed is:

1. A nickelate material, said material having an X-ray diffraction (XRD) pattern comprising a first peak from about 24.5-25.7 2Θ, and a second peak from about 11.8-13.0 2Θ.

2. The nickelate material of claim 1, wherein said XRD pattern further comprises at least one peak selected from the group consisting of a third peak from about 18.1-19.7 2Θ, a fourth peak from about 40.0-41.6 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 62.6-63.0 2Θ, a tenth peak from about 45.3-46.9 2Θ, and an eleventh peak from about 47.4-49.0 2Θ.

3. The nickelate material of claim 1, wherein said XRD pattern further comprises at least three peaks selected from the group consisting of a third peak from about 18.1-19.7 2Θ, a fourth peak from about 40.0-41.6 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 62.6-63.0 2Θ, a tenth peak from about 45.3-46.9 2Θ, and an eleventh peak from about 47.4-49.0 2Θ.

4. The nickelate material of claim 1, wherein said XRD pattern further comprises at least six peaks selected from the group consisting of a third peak from about 18.1-19.7 2Θ, a fourth peak from about 40.0-41.6 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 62.6-63.0 2Θ, a tenth peak from about 45.3-46.9 2Θ, and an eleventh peak from about 47.4-49.0 2Θ.

5. The nickelate material of claim 1, wherein said XRD pattern further comprises a third peak from about 18.1-19.7 2 Θ, a fourth peak from about 40.0-41.6 2Θ, a fifth peak from about 36.4-38.0 2Θ, a sixth peak from about 43.0-43.4 2Θ, a seventh peak from about 59.6-60.4 2Θ, an eighth peak from about 65.2-66.8 2Θ, a ninth peak from about 62.6-63.0 2Θ, a tenth peak from about 45.3-46.9 2Θ, and an eleventh peak from about 47.4-49.0 2Θ.

6. The nickelate material of claim 5, wherein said first peak has a full width at half maximum (FWHM) of about 0.68, said second peak has a FWHM of about 0.64, said third peak has a FWHM of about 0.97, said fourth peak has a FWHM of about 1.00, said fifth peak has a FWHM of about 0.95, said sixth peak has a FWHM of about 0.19, said seventh peak has a FWHM of about 0.46, said eighth peak has a FWHM of about 1.24, said ninth peak has a FWHM of about 0.29, said tenth peak has a FWHM of about 0.95, and said eleventh peak has a FWHM of about 1.12.

7. The nickelate material of claim 5, wherein said first peak has a normalized intensity relative to the fifth peak of 64±13, said second peak has a normalized intensity relative to the fifth peak of 353±58, said third peak has a normalized intensity relative to the fifth peak of 210±42, said fourth peak has a normalized intensity relative to the fifth peak of 58±12, said fifth peak has a normalized intensity of 100, said sixth peak has a normalized intensity relative to the fifth peak of 70±14, said seventh peak has a normalized intensity relative to the fifth peak of 17±5, said eighth peak has a normalized intensity relative to the fifth peak of 44±10, said ninth peak has a normalized intensity relative to the fifth peak of 30±6, said tenth peak has a normalized intensity relative to the fifth peak of 31±10, and said eleventh peak has a normalized intensity relative to the fifth peak of 38±10.

8. The nickelate material of claim 5, wherein said first peak is 25.1±0.2 2Θ, said second peak is 12.4±0.2 2Θ, said third peak is 18.9±0.2 2Θ, said fourth peak is 40.8±0.2 2Θ, said fifth peak is 37.2±0.2 2Θ, said sixth peak is 43.2±0.2 2Θ, said seventh peak is 60.0±0.2 2Θ, said eighth peak is 66.0±0.2 2Θ, said ninth peak is 62.8±0.2 2Θ, said tenth peak is 46.1±0.2 2Θ, and said eleventh peak is 48.2±0.2 2Θ.

9. The nickelate material of claim 1, wherein said first peak is 25.1±0.2 2Θ, and said second peak is 12.4±0.2 2Θ.

10. The nickelate material of claim 1, wherein said nickelate material is substituted.

11. An electrochemical cell, comprising:
a) a container; and
b) an electrode assembly disposed within the container and comprising a cathode, an anode, a separator located between the cathode and the anode, and an electrolyte solution; and
wherein the cathode comprises the nickelate material of claim 1.

12. The electrochemical cell of claim 11, wherein the cathode further comprises electrolytic manganese dioxide (EMD), chemical manganese dioxide, or copper oxide.

13. The electrochemical cell of claim 11, wherein the anode comprises an active material selected from the group consisting of zinc, magnesium, aluminum and silicon.

14. An alkaline electrochemical cell comprising the nickelate material of claim 1.

15. A cathode comprising the nickelate material of claim 1.

* * * * *

UNITED STATES PATENT AND TRADEMARK OFFICE
CERTIFICATE OF CORRECTION

PATENT NO. : 11,560,321 B2
APPLICATION NO. : 17/032496
DATED : January 24, 2023
INVENTOR(S) : Zheng It is certified that error appears in the above-identified patent and that said Letters Patent is hereby corrected as shown below:

In the Claims

Column 12,
Line 44, "2 Θ" should read --2Θ--.

Signed and Sealed this
Seventh Day of November, 2023

Katherine Kelly Vidal
*Director of the United States Patent and Trademark Office*